United States Patent Office 3,290,258
Patented Dec. 6, 1966

3,290,258
POLYMERIC ORGANOPHOSPHORUS COMPOUNDS
Morris L. Nielsen, Dayton, Ohio, and Darrel M. Harris, Glendale, Mo., assignors to Monsanto Research Corporation, St. Louis, Mo., a corporation of Delaware
No Drawing. Filed Oct. 23, 1962, Ser. No. 232,586
4 Claims. (Cl. 260—2)

This invention relates to polymeric organophosphorus compounds and to methods of preparing the same, and more particularly provides new and valuable polymeric phosphonamides.

According to the invention there are prepared high-molecular weight polymers by the reaction of an organodihalophosphorus compound with an oxybis(alkylamine) substantially according to the scheme:

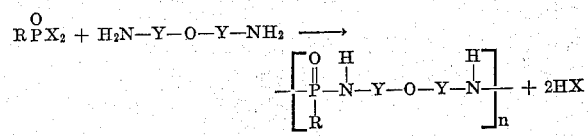

wherein R is aromatic hydrocarbon which is free of olefinic and acetylenic unsaturation and contains from 6 to 12 carbon atoms, Y is alkylene of from 2 to 6 carbon atoms, X is halogen and $n$ denotes the degree of polymerization. Generally $n$ will be from 100 to 1000.

The presently useful organodihalophosphorus compounds may be any aromatic hydrocarbonphosphonic acid dichloride, dibromide or diiodide wherein the hydrocarbon is free of aliphatic and acetylenic unsaturation, e.g., phenylphosphonic dichloride or dibromide, 2-, 3- or 4-tolylphosphonic dichloride or diiodide, 2-, 3- or 4- n-hexylphenylphosphonic dibromide or dichloride, pentamethylphenylphosphonic dichloride or diiodide, α- or β-naphthylphosphonic dichloride or dibromide, 2-, 3- or 4-biphenylylphosphonic dibromide or dichloride, 2-, 3- or 4-benzylphenylphosphonic dichloride or diiodide, 2-, 3- or 4-cyclopentylphenyl phosphonic dibromide or dichloride, 1- or 5-acenaphthenylphosphonic dichloride or dibromide, etc.

The oxybis(alkylamines) which are reacted with the hydrocarbonphosphonic acid dihalides are 3,3'-oxybis(propylamine), 4,4'-oxybis(butylamine), 2,2'-oxybis(ethylamine), 5,5'-oxybis(pentylamine), 6,6'-oxybis(hexylamine), 2,2'-oxybis(1-methylethylamine), 4,4'-oxybis(1-ethylbutylamine), 3,3'-oxybis(1-methylpropylamine), etc.

Reaction of the hydrocarbonphosphonic dihalide with the oxybis(alkylamine) to give the polymeric phosphoramides may be conducted by simply mixing the two reactants in the presence of a basic agent and allowing the mixture to stand until polymerization is completed. The reaction is generally exothermic; hence heating is note generally required. However, when working with the somewhat sluggish higher hydrocarbonphosphonic dihalides, e.g., the biphenylphosphonic dichlorides or the dipentylphenylphosphonic dibromides, or with the higher oxybis(alkylamines) such as 6,6'-oxybis(hexylamine), heating may be used for the purpose of decreasing reaction time. Temperatures of from, say, 60° C. to 150° C., are thus useful.

Advantageously, the reaction is conducted in the presence of an inert, liquid diluent or solvent, and when such diluent or solvent is employed and the reaction appears to be sluggish, operation at the refluxing temperature of the reaction mixture, at least toward the end of the reaction, is a convenient means of assuring completion of the reaction within an economically feasible length of time. Examples of suitable diluents are chloroform, dioxane, benzene, xylene, acetone, carbon tetrachloride, dimethylformamide, dimethyl sulfoxide, etc.

The basic agent, which serves not only to catalyze the reaction but may also serve as hydrogen halide scavenger, may be organic or inorganic, e.g., an alkali metal hydroxide or basic salt thereof such as sodium, potassium, lithium or rubidium hydroxide, carbonate or acetate; an alkali metal alkoxide such as sodium or potassium methoxide or propoxide; a tertiary alkylamine such as trimethylamine or tributylamine; a heterocyclic nitrogen base such as N-methylmorpholine or pyridine; a quaternary ammonium compound such as benzyltrimethylammonium methoxide or tetrabutylammonium butoxide, etc.

Since reaction occurs with formation of hydrogen halide, it is advisable to make provision for removal of the halide as it is formed, e.g., by means of vigorous stirring and/or dephlegmation and/or by employing the basic material in an amount sufficient to serve as hydrogen scavenger, whereby the hydrogen halide which is formed is removed from the reaction zone as the halide of the base.

All of the reaction variables, i.e., nature of diluent, basic agent, temperature, pressure etc., can be arrived at readily by easy experimentation. Since reaction is evidenced by change in viscosity and evolution of hydrogen halide, progress of the reaction can be followed by noting these.

Two moles of the oxybis(alkylamine) react with one mole of the hydrocarbonphosphonic dihalide to yield the present polymers; hence the two reactants are advantageously employed in such stoichiometric proportions. However, an excess of either reactant may be employed, although the average molecular weight of the polymer product generally will be lower than when stoichiometric amounts are used. There may be used a mixture of two or more hydrocarbonphosphonic dihalides, e.g., a mixture of p-tolylphosphonic dichloride and β-naphthylphosphonic dibromide and there may be used a mixture of two or more oxybis(alkylamines), e.g., a mixture of 2,2'-oxybis(ethylamine) and 4,4'-oxybis(butylamine), to obtain polymers having various linkages dispersed more or less randomly in the polymer chain.

The presently provided polymeric oxy alkylene amides of aromatic hydrocarbon phosphonic acids range from waxy to high-melting solids. Of particular importance are those of the polymers which are solid, resinous materials. Such products are useful as impregnating agents and adhesives for laminates, and as the resinous base of oil vehicle coatings. They can be spun into fibers from solutions or the molten polymers may be cast or extruded through suitable orifices.

The invention is further illustrated by, but not limited to, the following example.

Example 1

To a mixture of 300 ml. of water, 29.36 g. sodium hydroxide and 48.4 g. of 3,3'-oxybis(propylamine) there was added dropwise, during a period of 1 hour, a solution of 71.6 g. of phenylphosphonic dichloride in 400 ml. of chloroform while maintaining the temperature of the reaction mixture at 0° C. to 5° C. The whole was then stirred for 2 hours at this temperature, and then allowed to stratify. The resulting chloroform layer was separated. Upon addition of hexane thereto the polymeric product was precipitated. It was filtered off and dried under vacuum at about 75° C., to give a 68% theoretical yield of the polymeric phosphoramide, having a decomposition point of about 262° C. and consisting essentially of the repeating unit

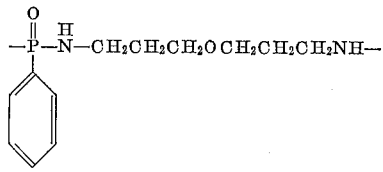

Nuclear magnetic resonance study of the polymer showed a single peak for $P^{31}$ at $-23.4$ p.p.m. (16.2 mc.) in methanol, which is characteristic of

The molten polymer was poured into mold to give hard, smooth well-defined casts.

We claim:

1. A polymeric phosphonamide consisting essentially of the repeating unit

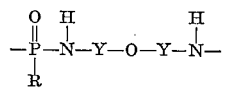

wherein R is aromatic hydrocarbon which is free of olefinic and acetylenic unsaturation and contains from 6 to 12 carbon atoms, and Y is alkylene of from 2 to 6 carbon atoms.

2. The polymeric phosphonamide defined in claim 1, further limited in that R is phenyl.

3. The polymeric phosphonamide defined in claim 1, further limited in that Y is propylene.

4. A polymeric phosphonamide consisting essentially of the repeating unit

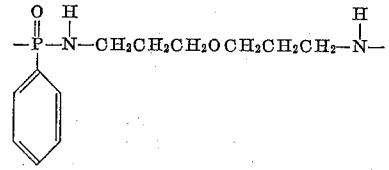

References Cited by the Examiner
UNITED STATES PATENTS

| | | | |
|---|---|---|---|
| 2,163,636 | 6/1939 | Spanagel | 260—78 |
| 2,191,556 | 2/1940 | Carothers | 260—78 |
| 3,116,268 | 12/1963 | Farago | 260—.2 |
| 3,127,357 | 3/1964 | Garner | 260—2 |

WILLIAM H. SHORT, *Primary Examiner.*

H. D. ANDERSON, *Assistant Examiner.*